US008020210B2

United States Patent
Tippett et al.

(10) Patent No.: US 8,020,210 B2
(45) Date of Patent: Sep. 13, 2011

(54) SYSTEM AND METHOD FOR ASSESSING RISK TO A COLLECTION OF INFORMATION RESOURCES

(75) Inventors: Peter S. Tippett, Great Falls, VA (US); Samuel Migues, Chantilly, VA (US); Paul David Robertson, Alexandria, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1100 days.

(21) Appl. No.: 10/863,855

(22) Filed: Jun. 9, 2004

(65) Prior Publication Data

US 2005/0278786 A1 Dec. 15, 2005

(51) Int. Cl.
*G06F 12/14* (2006.01)
(52) U.S. Cl. .......................................... 726/25; 726/23
(58) Field of Classification Search ................. 726/25
See application file for complete search history.

(56) References Cited

U.S. PATENT DOCUMENTS

| 7,103,874 | B2 * | 9/2006 | McCollum et al. | 717/121 |
| 7,257,630 | B2 * | 8/2007 | Cole et al. | 709/224 |
| 2003/0046128 | A1 * | 3/2003 | Heinrich | 705/7 |
| 2004/0044912 | A1 * | 3/2004 | Connary et al. | 713/201 |

* cited by examiner

*Primary Examiner* — Nasser Moazzami
*Assistant Examiner* — Carlton V Johnson

(57) ABSTRACT

A system and method for assessing the risk to information resources that may include the generation and/or use of a security risk index. The security risk index may represent the security of information resources. The security risk index may be based on at least one factor. The at least one factor may be individually quantified. The at least one factor may include a threat factor associated with a rate or frequency of security events that threaten the security of the information resources, a vulnerability factor associated with a likelihood of a security event breaching the security of the information resources, an impact factor associated with an expected cost of a breach of the security of the information resources, or another type of factor. The security risk index of a subset of information resources including at least one resource may enable various comparisons and observations with respect to the security of the subset of information resources. The security risk index may be updated for a variety of reasons, such as, to be kept current, or for another reason.

27 Claims, 6 Drawing Sheets

|  | A Quality | B Quality | C Quality | D Quality |
|---|---|---|---|---|
| Precicesness | +/- 0% | +/- 10% | +/- 20% | +/- 30% |
| Sample SRI | 2,132 | 1900 - 2300 | Red >2300; Orange 1500-2200; Yellow 900-1500; Blue <900 | Red Orange Yellow Blue |
| Depth of Inquiry | Comprehensive compliance evaluation (on site investigation). | Adv. Questionaire, vulnerability tests, and a phone interview. | Standard Questionaire and perimeter vulnerability testing. | Superficial inquiry. |

FIG. 5

SYSTEM AND METHOD FOR ASSESSING RISK TO A COLLECTION OF INFORMATION RESOURCES

FIELD OF THE INVENTION

The invention relates to the generation and use of a security risk index for assessing the security of information resources.

BACKGROUND OF THE INVENTION

The security of information resources, such as, data, networks, systems, information, business intelligence, hardware, software, and other resources, is an increasingly important issue, particularly given their growth over the last decade and people's reliance on them. For example, networks are used by institutions, schools, organizations and other entities to communicate and store electronic documents and information, among other things. These networks may include networks coupled to or providing access to other computer networks. Greater utilization of networks for storing and communicating information resources has produced a corresponding increase in the size and complexity of networks in general.

With the growth of networks, and the amount and importance of information resources available on the networks, there is also a need for better and more intelligent security. One approach to securing larger and more complex networks is to use a greater number and variety of security assessment tools. Security assessment tools are used to evaluate the security of information resources by determining susceptibility to security events that threaten the security of the information resources, such as an attack from hackers, or other event. Security assessment tools are also used more and more frequently to closely monitor a network that has access to information resources.

However, conventional security assessment tools are not able to provide a standard index or other metric that may be updated at periodic intervals, and that may represent the security of a set, subset, or other collection of information resources. Consequently, the relative security of a specific subset of information resources may not be compared to the general security of information resources, or to the relative security of another specific subset of information resources. Further, trends in the security of information resources generally, or of a specific set of information resources may not be viewed or compared over a period of time.

In light of these and other problems, there is a need for an improved system and method of security assessment that provides a metric that represents the security of (or risk to) information resources or sets, subsets, or other collections thereof.

SUMMARY OF THE INVENTION

One aspect of the invention relates to the generation and use of a security risk index for assessing the security of information resources. Information resources may include data, a network, a system, information, business intelligence, hardware, software, or other resource. The security risk index may be based in part on at least one factor. According to some embodiments of the invention, some or all of the at least one factor may be individually quantified. In an exemplary embodiment, the at least one factor may include a threat factor associated with a rate or frequency of security events that threaten the security of the information resources, a vulnerability factor associated with a likelihood of a security event breaching the security of the information resources, an impact factor associated with an expected cost of a breach of the security of the information resources, or another type of factor.

The at least one factor may be derived in part from at least one factor component associated with the at least one factor. A factor component may be classified as one or more of a system factor component, a non-system factor component, an internal factor component, an external factor component, or another type of factor component. In some embodiments of the invention, some or all of the at least one factor component may be individually quantified.

Because at least one factor component used to determine the at least one factor may vary independently over time, a security risk index may be updated at various intervals for a variety of reasons including, for example, to be kept current, or another reason. In some embodiments, the security risk index may be updated at a predetermined event trigger to keep the security risk index current. A predetermined event trigger may include an end of a predetermined time period, a predetermined security related action or event, a change in the at least one factor that exceeds a predetermined amount, a change in the at least one factor component that exceeds a predetermined amount, or any other event.

In some embodiments of the invention, a security risk index may be associated with a general security risk. A general security risk index may be generated to represent the general security of a collection of information resources that may include all, or substantially all, the information resources associated with one or more networks, such as a large common wide area network (WAN), like the Internet or the World Wide Web, or other network or networks. The general security risk index may be determined in part by at least one general factor, such as, a general threat factor, a general vulnerability factor, a general impact factor, or any other type of factor.

In some embodiments of the invention, a security risk index may be associated with a local security risk. A local security risk index may represent the security of a specific collection of information resources, such as, a specific set or subset of information resources, or other collection. A specific subset of information resources may include a subset of electronic resources associated with a specific entity or group of entities. Examples of a specific entity or group of entities may include an individual; a group of individuals; a community; an organization; an institution; a group of institutions within an industry; a group of institutions of the same approximate size; a group of individuals, institutions, or other organizations within a country; or any other entity or group of entities. The local security risk index may be based on at least one factor, such as a general threat factor, a local vulnerability factor, a general impact factor, or any other type of factor.

In some embodiments of the invention a preciseness of the security risk index may be determined. The preciseness of a security risk index may depend on a number of factor components used to derive at least one factor from which the security risk index is at least partially determined. A greater number of factor components may produce a more precise security risk index than a smaller number of factor components. In some embodiments the level of preciseness of the security risk index may be represented in a reporting scheme. For example, the reporting scheme used to report the security risk index may include reporting a number, a range of numbers, a signal symbolizing a range of numbers, a signal, or any other reporting scheme that might convey the security risk index and represent a level of preciseness.

In some embodiments of the invention, the generation of security risk indices may allow for comparison between the security of a specific subset of information resources and the security of information resources in general by comparing the local security risk index of a specific subset of information resources to a general security risk index. Further, comparing the local security risk indices of at least two specific subsets of information resources associated with at least two groups of entities, wherein each group of entities is made up of at least one entity, may allow for the security of the at least two specific subsets of information resources associated with the at least two groups of entities to be compared, despite at least one difference between the at least two subsets of information resources and/or the at least two groups of entities.

A difference between the at least two subsets of information resources may include a size difference, a difference in an amount of resources, a storage method difference, a resource type difference, or any other difference. A difference between the at least two groups of entities may include a difference in the sizes of the at least two groups of entities, a difference in the number of entities included in the at least two groups of entities, a difference in the types of entities included in the at least two groups of entities, a difference in the location of the entities included in the at least two groups of entities, or any other difference between the at least two groups of entities.

In some embodiments of the invention, a security risk index may permit changes in a level of security of information resources to be observed. These changes may include general trends observed by viewing a general security risk index over time, general security effects of a particular innovation in information resources security by comparing a general security risk index determined prior to the particular innovation to a general security risk index determined subsequent to the particular innovation, trends in the security of a specific subset of information resources over time by monitoring a local security risk index over time, an effectiveness of a mitigating measure designed to increase the security of a specific subset of information resources by comparing a local security risk index determined prior to the mitigating measure with a local security risk index determined subsequent to the mitigating measure, changes to the security level of a specific subset of information resources in relation to a general security of information resources by comparing a local security risk index with a general security risk index over time, relative changes to the security level of at least two specific subsets of information resources associated with at least two groups of entities, wherein each group of entities includes at least one entity, by viewing at least two local security risk indexes that correspond to the at least two specific subsets of information resources over time, or any other changes.

In some embodiments of the invention, a security risk index may also be used to certify the security of a specific subset of information resources when a local security risk index of the specific subset of information resources reaches a predetermined level (i.e. a certification level). The certification level may be a dynamic value determined in part by a general security risk index, a fixed value, or some other value. Various certification levels may be determined specifically for a selected entity or group of entities. Conversely, the certification level may be a standard determined independently from the needs of any single entity or group of entities. The certification of the security of a specific subset of information resources associated with an entity or group of entities may provide the entity or group of entities with an objective security goal, and may further allow the entity or group of entities to verify to outside parties such as clients, partners, associates, insurers, vendors, consultants, competitors, or other parties, that the specific subset of information resources associated with the entity or group of entities is secure.

In some embodiments of the invention, a previously determined security risk index of a subset of information resources may be evaluated to determine if the security risk index indicates that a security level meets or exceeds a security threshold. This evaluation may serve as a prerequisite for performing an action with respect to the subset of information resources wherein the action may not be enabled unless the security risk index indicates a security level higher than the security threshold. An action may include, connecting to one or more of the information resources, downloading one or more of the information resources, opening one or more of the information resources, otherwise accessing one or more of the information sources, uploading one or more additional information resources to the subset of information resources, or other action. The evaluation and/or the enablement of an action may be completely (or substantially completely) automated. The security threshold may be configurable by a user, or may be determined using another method, such as using a certification level to represent the security threshold, or other method.

BRIEF DESCRIPTION OF THE DRAWINGS

FIG. 5 illustrates an embodiment of a scheme for reporting a security risk index.

DETAILED DESCRIPTION

Figure 1A:
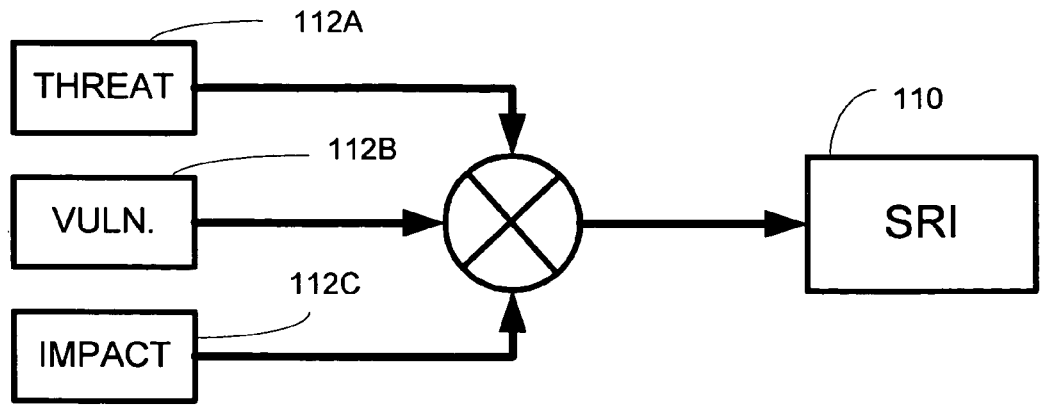
FIG. 1 illustrates an embodiment of a method for determining a security risk index.

The invention generally relates to the generation and use of a security risk index for assessing the security of information resources. According to various embodiments of the invention, a security risk index (SRI) may be expressed as $SRI=T*V*I$, where T may represent a threat factor associated with a rate or frequency of security events that threaten the security of the information resources; V may represent a vulnerability factor associated with a likelihood of a security event breaching the security of the information resources; and I may represent an impact factor associated with an expected cost of a breach of the security of the information resources. Referring to FIG. 1A, this may be illustrated conceptually as a security risk index 110 which may be the product of an at least one factor 112, including a threat factor 112A, a vulnerability factor 112B, and/or an impact factor 112C. In other embodiments of the invention, a security risk index equation may include any, all, or none of the factors T, V, and I set forth above, and/or may further include at least one additional factor.

Figure 1B:
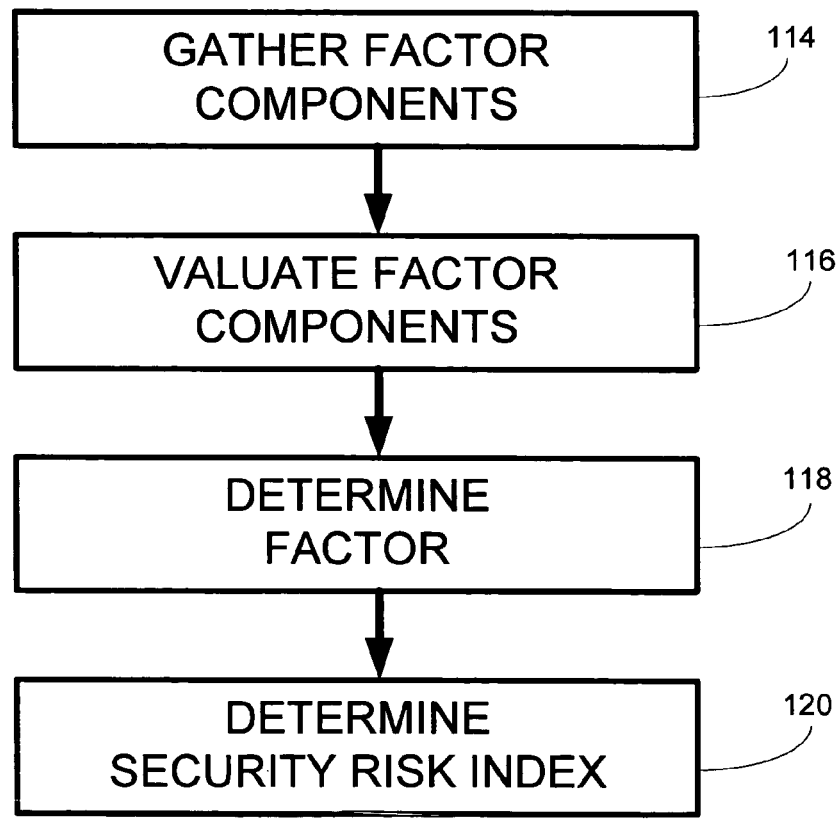

FIG. 1B illustrates an embodiment of a process for determining a security risk index. The at least one factor 112 may be derived in part from at least one factor component associated with the at least one factor 112. These factor components are gathered in a factor component gathering operation 114. The factor component gathering operation 114 may include one or more information gathering activities, such as, a modeling activity, a data mining activity, a surveying activity, a searching activity, or other information gathering activity. A factor component may be classified as one or more of a system factor component, a non-system factor component, an internal factor component, an external factor component, or another type of factor component.

The at least one factor component may then be assigned a value at a factor component valuating operation 116. The factor component valuating operation 116 may include one or more valuating activities, such as, a modeling activity, a research activity a historical correlation activity, a surveying activity designed to ascertain a perceived value, a surveying activity designed to ascertain an actual value, a surveying activity designed to ascertain a historically proven value, another surveying activity, a data mining activity, a searching activity, or other valuating activity.

The at least one factor component may then be used to determine the at least one factor 112 at a factor determining operation 118. The determination of the at least one factor 112 may entail combining a plurality of valuated factor components associated with each factor using statistical mathematics, Bayesian logic, sampling and measurement, or another method.

Once the at least one factor 112 has been derived, the at least one factor 112 may be used to determine the security risk index 11 in a security risk index determining operation 120. In the embodiment shown, the security risk index determining operation 120 may include using the security risk equation to obtain the security risk index 110 from the at least one factor 112.

Figure 2:
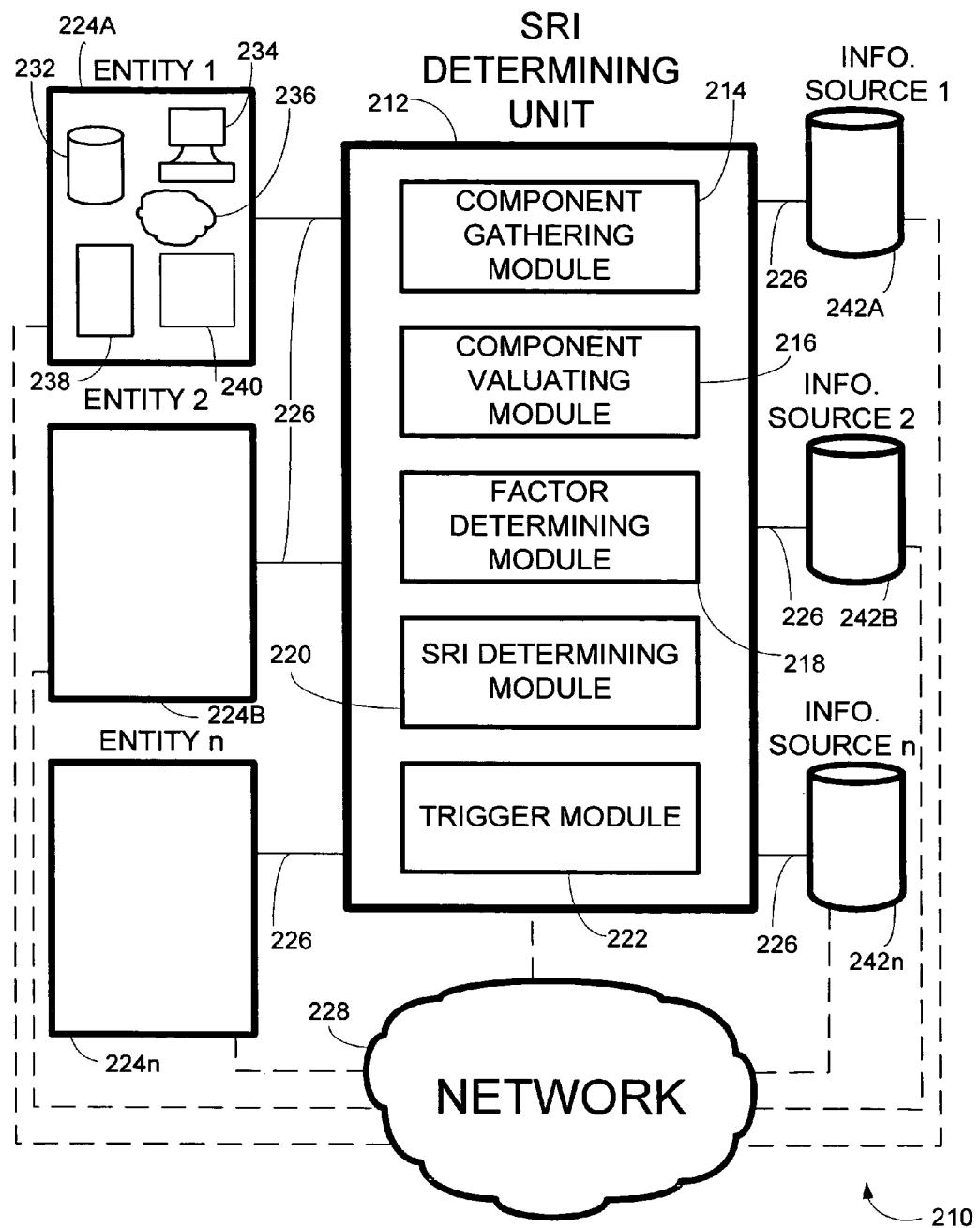
FIG. 2 illustrates an embodiment of a system for determining a security risk index.

FIG. 2 illustrates an exemplary embodiment of a system architecture 210 for determining at least one security risk index and features a security risk index determining unit 212. The security risk index determining unit 212 may include a factor component gathering module 214, a factor component valuating module 216, a factor determining module 218, a security risk index determining module 220, and a trigger module 222.

The factor component gathering module 214 may perform functionality associated with gathering the at least one factor component, and the factor component valuating module 216 may perform functionality associated with valuating the at least one factor component. The factor determining module 218 may perform functionality associated with determining the at least one factor 112, and the security risk index determining module 220 may perform functionality associated with determining the security risk index 110. Because some or all of the at least one factor component may vary independently over time, the security risk index 110 may be updated at various intervals for a variety of reasons including, for example, keeping the security risk index 110 current, or another reason. To achieve this, the security risk index 110 may be updated periodically at a predetermined event trigger detected by the trigger module 222. A predetermined event trigger may include an end of a predetermined time period, a predetermined security related action or event, a change in the at least one factor or the at least one factor component that exceeds (or falls below) a predetermined threshold, or any other event.

As would be appreciated, these and other modules described throughout the specification are representative of software modules running in a distributed computing environment, and that the invention may also be implemented using different types of modules for use on or with various types of computers. As would be appreciated, various ones of the program modules may be physically located in and/or operate on different local and remote devices, including non-transitory computer readable media. Furthermore, execution of the program modules may occur locally in a stand-alone manner or remotely in a client/server manner.

The security risk index determining unit 212 may be operatively coupled to at least one of a plurality of entities 224 (illustrated in FIG. 2 as an entity 224A, an entity 224B, and an entity 224n). Each of the plurality of entities 224 may be connected or otherwise operatively coupled to the security risk index determining unit 212 by an information link 226. The information links 226 illustrated in FIG. 2 represent any suitable method of communicating information, and may or may not be a physical link between each of the plurality of entities 224 and the security risk index determining unit 212. Alternatively, information may flow between the entities 224 and the security risk determining unit 212 by way of one or more networks 228.

For the purpose of illustration a specific entity 224A within the plurality of entities 224 is shown in further detail. The entity 224A is illustrated as one example of many embodiments of an entity. These embodiments may include an individual; a group of individuals; an institution; a community; an organization; a group of institutions within an industry; a group of institutions of the same approximate size; a group of individuals, institutions, or other organizations within a country; or any other entity. The entity 224A may be associated with various information resources for storing or manipulating other information resources, such as one or more databases 232, one or more computer terminals 234, one or more computer networks 236, one or more servers 238, and one or more other information resources 240. As would be appreciated, the information resources of the entity 224A illustrated as being associated therewith are not meant to be an exhaustive list of possible information resources, or a set of required information resources, but are provided merely for illustration, and that an entity may be associated with one or many information resources for storing or manipulating other information resources associated with that entity. Further, it would be appreciated that an entity may include one or more consultants, vendors, customers, home users, other entities or combinations of entities.

The security risk index determining unit 212 may further be connected to at least one of a plurality of information sources 242 (illustrated as an information source 242A, an information source 242B, and an information source 242n) via information links 226 or the network 228. The plurality of information sources 242 may include sources of information relating to the security of information resources including public databases, network chat forums, network message boards, scholarly journals, periodicals, personal and commercial web pages, sensors, machine records, trust values, or any other source of information. The plurality of information sources 242 may further include private and/or public databases created by data mining any or all of the aforementioned information sources.

Figure 3A:
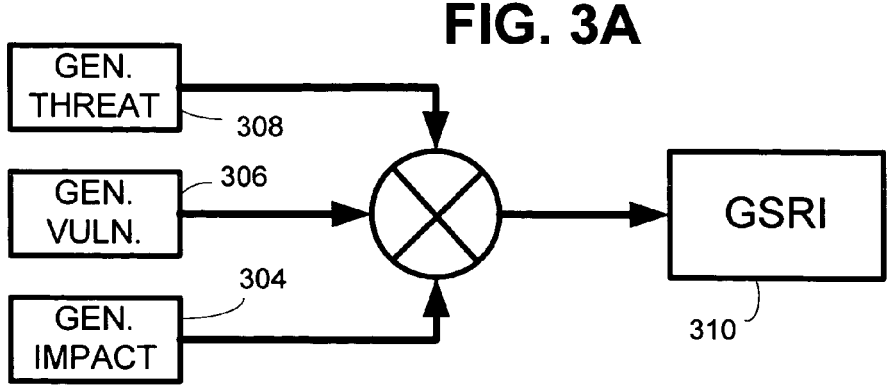
FIG. 3 illustrates an embodiment of a method for determining a general security risk index.

In some embodiments of the invention, a security risk index may be a general security risk index. A general security risk index may be generated to represent the general security of all (or substantially all) the information resources associated with one or more networks. Examples of one or more networks may include a large common wide area network (WAN), like the Internet or the World Wide Web, or another network or networks. In some embodiments of the invention, a general security risk index (GSRI) may be expressed as $GSRI=GT*GV*GI*K$, where GT may represent a general threat factor, GV may represent a general vulnerability factor, GI may represent a general impact factor, and K may represent a constant factor. In other embodiments of the invention a general security risk index equation may include any, all, or none of the factors GT, GV, GI, and K set forth above, and/or may include at least one additional factor. This is illustrated conceptually in FIG. 3A as a general security risk index 310 being the product of at least a general threat factor 308, a general vulnerability factor 306, and/or a general impact factor 304.

The constant factor K may be included in the general security risk index equation in order to normalize the general security risk index 310 for a certain point in time. For example, the constant factor K may be set such that the general security risk index 310 for a certain day, designated as a starting point for the general security risk index 310 of the network 228, is a round number, such as one thousand, or another baseline number. Thus, the general state of security on the network 228 may always be easily comparable to the designated starting point of the general security risk index 310 on the network 228.

Figure 3B:
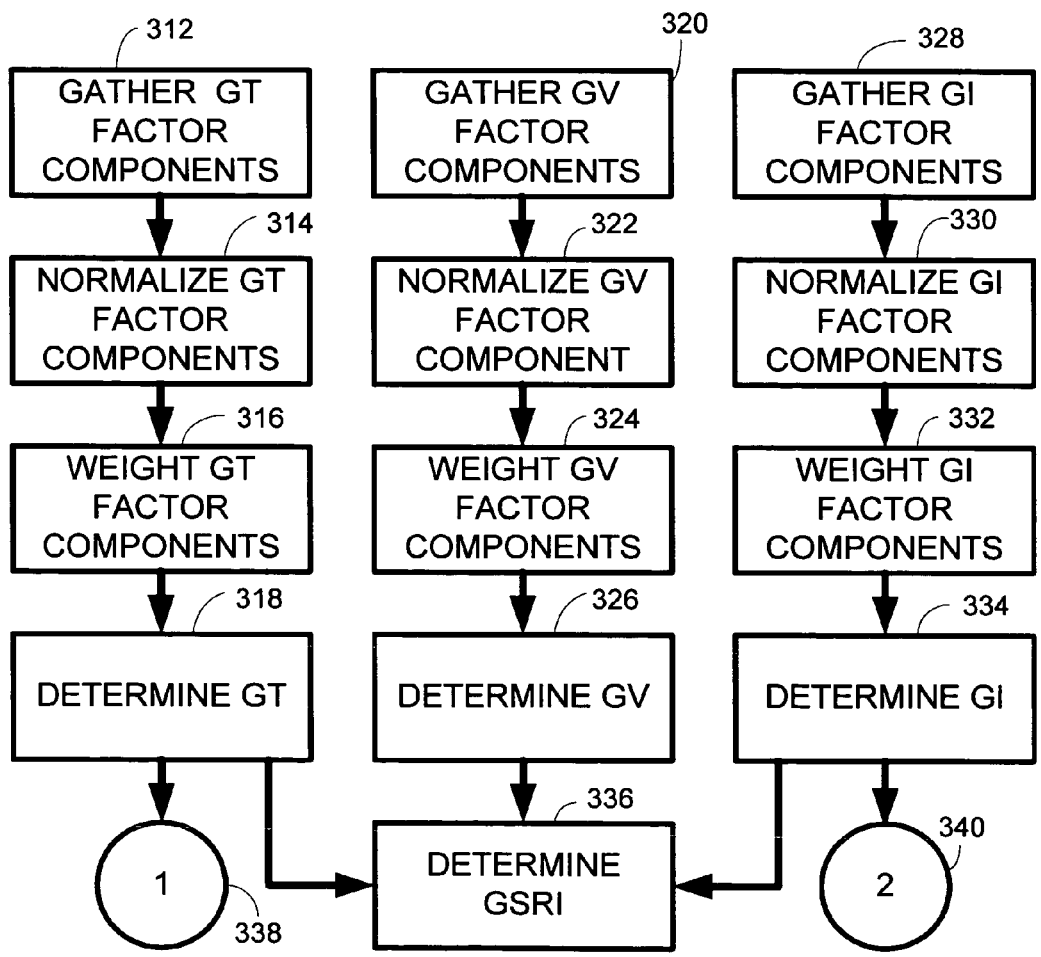

FIG. 3B illustrates a process for determining the general security risk index 310 for the network 228 according to various embodiments of the invention. The general security risk index 310 may represent the general security of all the information resources associated with the network 228.

The process may include a general threat factor component gathering operation 312 for gathering at least one general threat factor component. The general threat factor component gathering operation 312 may include obtaining data from the plurality of information sources 242 pertaining to security events that threaten the security of the information resources and the frequency or rate at which they occur on the network 228. This data may include, new types of security events and their severity, information relating to future security events discovered in chat rooms or on message boards, current trends in the implementation of security events, or any other data related to security events that have transpired on the network 228. A security event may be any event that threatens the security of one or more information resources, such as, an electronic event, a physical event, an intentional event, an unintentional event, a man-made event, a natural event, an internal event, an external event, a system event, a non-system event, or other event.

In some embodiments of the invention, the at least one gathered general threat factor component may be in a format that is not conducive to combining the at least one general threat factor component to determine the general threat factor 308. For example, data gathered by the general threat factor component gathering operation 312 may be in the form of a rate, a frequency, a count, a scale, or another form. For this reason a general threat factor normalizing operation 314 and a general threat factor weighting operation 316 may be provided to convert the at least one general threat factor component gathered in the general threat factor component gathering operation 312 into a common format, and to rank the at least one general threat factor component based on, for example, the severity of a possible security event, the probability of a future security event, the predictability of a possible security event, or any other basis.

Once the at least one general threat factor component has been normalized and weighted, the at least one general threat factor component may be combined to determine the general threat factor 308 for the network 228 at a general threat factor determining operation 318. At the general threat factor determining operation 318, the at least one general factor component may be combined using statistical mathematics, Bayesian logic, sampling and measurement, or another method.

With respect to the determination of the general vulnerability factor 306, a general vulnerability factor component gathering operation 320 may be provided to gather at least one general vulnerability factor component including information relating to a likelihood of a security event breaching the security of information resources on the network 228. This information may be located on the at least one information source 242 and may include a number of security events that lead to breaches in security, a number of security events that do not lead to breaches in security, a probability that a certain type of security event will lead to a breach in security, a prevalence of certain mitigating measures designed to secure information resources, or any other suitable type of information.

Because the at least one general vulnerability factor component gathered at the general vulnerability factor component gathering operation 320 may be in a form not suitable for determining the general vulnerability factor 306, a general vulnerability factor component normalizing operation 322 and a general vulnerability factor component weighting operation 324 may be provided. At the general vulnerability factor component normalizing operation 322, the at least one general vulnerability factor components may be converted into a form that will allow the at least one general vulnerability factor component to be combined to determine the general vulnerability factor 306. At the general vulnerability factor component weighting operation 324, the normalized at least one general vulnerability factor component may be given a greater or lesser weight depending on the vulnerability of information resources associated with the network 228 that the at least one general vulnerability factor component represents.

After the at least one general vulnerability factor component has been normalized and weighted at the general vulnerability factor component normalizing operation 322 and the general vulnerability factor component weighting operation 324, the at least one general vulnerability factor component may be used to determine the general vulnerability factor 306 at a general vulnerability factor determining operation 326. The general vulnerability factor 306 of the network 228 may be determined by combining the at least one general vulnerability factor component using statistical mathematics, Bayesian logic, sampling and measurement, or another method.

Regarding the general impact factor 304 of the network 228, at a general impact factor component gathering operation 328, at least one general impact factor component may be gathered. The at least one general impact factor component may include information located on the at least one information source 242 and may relate to an expected cost of a breach of the security of the information resources associated with the network 228. The general impact factor component may include information such that the general impact factor 304 may reflect all (or substantially all) effects associated with a security breach on the network 228. This includes information relating to the hard and soft costs of a security breach such as the cost of previous security breaches, the future cost of predicted security preaches, public sentiment with regard to security breaches, or other information.

In some embodiments of the invention, the at least one general impact factor component gathered at the general impact factor component gathering operation 328 may be in a form not suitable for determining the general impact factor 304, so a general impact factor component normalizing operation 330 and a general impact factor component weighting operation 332 may be provided. The at least one general impact factor component may be converted into a form that will allow the at least one impact vulnerability factor component to be combined to determine the general impact factor 304 of the network 228 at the general impact factor component normalizing operation 330. The normalized at least one general impact factor component may be given a greater or lesser weight depending on the cost and type of cost that the at least one general impact factor component represents at the general impact factor component weighting operation 332. The normalized and weighted at least one general impact factor component may then be combined using statistical mathematics, Bayesian logic, sampling and measurement, or another method, to determine the general impact factor 304, at a general impact factor determining operation 334.

In some embodiments of the invention, the general threat factor 308, the general vulnerability factor 306, and the general impact factor 304 may be used at a general security risk index determining operation 336 to determine the general security risk index 310 of the network 228 using the general security risk equation 310. Further, a general threat output 338 of the general threat factor determining operation 318, and a general impact output 340 of the general impact factor determining operation 334 may also be generated for use in determining one or more other security risk indices, or other purpose.

Figure 4A:
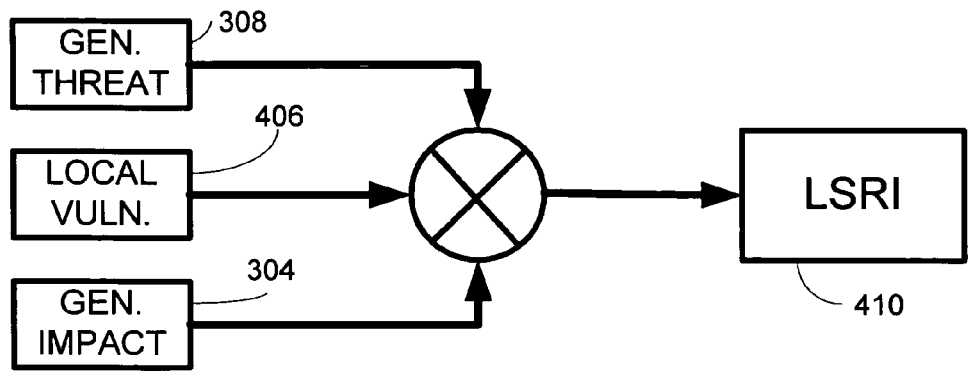
FIG. 4 illustrates an embodiment of a method for determining a local security risk index.
Figure 4B:
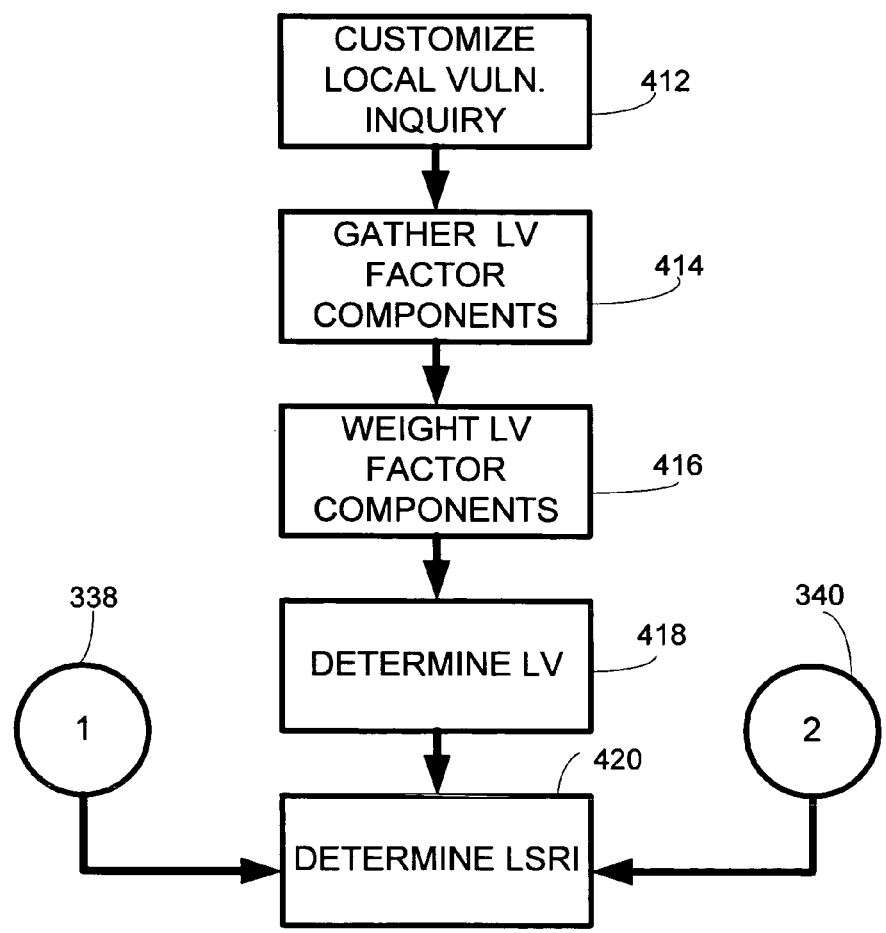

In some embodiments of the invention, a security risk index, such as those illustrated in FIGS. 4A and 4B, may be a local security risk index representing the security of a specific subset of information resources. The specific subset of information resources may include a subset of information resources associated with the entity 224A. It will be appreciated that the use of the entity 224A for the purposes of describing the method of determining a local security risk index is for illustration only, and that a local security risk index may alternatively be determined for any other entity or group of entities.

According to various embodiments of the invention, a local security risk index (LSRI) may be expressed as LSRI=GT*LV*GI where GT may be associated with a general threat factor, LV may be associated with a local vulnerability factor, and GI may be associated with a general impact factor. In other embodiments of the invention, a local security risk index may include any, all, or none of the factors GT, LV, and GI set forth above, and may further include at least one additional factor. This is illustrated conceptually in FIG. 4A as a local security risk index 410 being the product of at least one of the general threat factor 308, a local vulnerability factor 406, and/or the general impact factor 304.

FIG. 4B illustrates a process for determining the local security risk index 410 for the entity 224A according to one or more embodiments of the invention. At a local vulnerability inquiry customizing operation 412 the entity 224A may customize a standard local vulnerability inquiry. This may include adding or subtracting at least one local vulnerability query such as, a type of possible security breach that is unique to or inapplicable to the entity 224A, a certain mitigating measure designed to secure information resources that is unique to or inapplicable to the entity 224A, or another query.

At a local vulnerability factor component gathering operation 414, at least one local vulnerability factor component is gathered. The at least one local vulnerability factor component may be determined based on the at least one standard or customized local vulnerability query related to the presence of at least one mitigating measure designed to secure information resources, a past history of at least one type of security breach, a future plan for securing the information resources associated with the entity 224A, or any other type of query related to the local vulnerability of the information resources associated with the entity 224A.

In some embodiments of the invention, once the at least one local vulnerability factor component has been gathered at the local vulnerability factor component gathering operation 414, the at least one local vulnerability factor component may be weighted at a local vulnerability factor component weighting operation 416. At the local vulnerability factor component weighting operation 416 the at least one local vulnerability factor component may be weighted based on an effectiveness of a mitigating measure designed to secure information resources that has been employed by the entity 224A, a past rate of success for a specific type of security event against the entity 224A, a rate or frequency at which a specific type of security event experienced by the entity 224A, or any other appropriate feature.

For example, at local vulnerability factor gathering operation 414, the implementation, and extent of implementation, of a predetermined list of one or more mitigating measures designed to increase the security of information resources may be used to determine the at least one local vulnerability factor component. At local vulnerability factor component weighting operation 416 the mitigating measures designed to increase the security of information resources that have been implemented may yield a weighted local vulnerability factor component for each of one or more security events included in a list possible security events. The weighted local vulnerability factor component may be based on the effectiveness of a specific implemented mitigating measure to safeguard information resources against a specific type of security event.

According to various embodiments of the invention, weighting local vulnerability factor components may include evaluating the effectiveness of the specific implemented mitigating measure according to one or more different aspects of mitigation. The effectiveness of the specific implemented mitigating measure, according to various aspects of mitigation, may be combined to determine a single effectiveness for the specific implemented mitigating measure. An aspect of mitigation may include a deterrence aspect, a protection aspect, a detection aspect, a recovery aspect, a transference aspect, or other aspect.

In some embodiments, more than one implemented mitigating measure may safeguard against a same specific type of security event. In such cases, the more than one implemented mitigating measure may protect against the specific type of security event in a synergistic fashion that may be reflected in the valuated local vulnerability factor component associated with the specific type of security event. Mathematically this may be represented as:

$$LVFC = 1 - ((1-E_1) \cdot (1-E_2) \cdot \ldots (1-E_n)),$$

where LVFC may represent the valuated local vulnerability factor component for the specific type of security event, and $E_1$–$E_n$ may represent probabilities that the various one or more implemented mitigating measures will prevent the specific type of security event from causing a breach of security.

Subsequent to the local vulnerability factor component weighting operation 416, the local vulnerability factor 406 may be determined at a local vulnerability factor determining operation 418 by combining the weighted at least one local vulnerability factor component. The at least one local vulnerability factor component may be combined, for example, using statistical mathematics, Bayesian logic, sampling and mitigating measurement, or another method.

After the local vulnerability factor 406 has been obtained, the local security risk index 410 may be determined at a local security risk index determining operation 420. At the local security risk index determining operation 420 the local vulnerability factor 406 may be combined with the general threat factor 308 of the general threat output 338 and the general impact factor 304 of the general impact output 340 to determine the local security risk index 410 of the entity 224A.

A preciseness of a security risk index may depend on an amount of factor components used to derive at least one factor from which the security risk index is at least partially determined. A greater number of factor components may produce a more precise security risk index than a smaller number of factor components. FIG. 5 includes a table 510 illustrating a scheme for reporting a security risk index while representing a level of preciseness of the security risk index. According to the scheme illustrated in FIG. 5, the security risk index may be reported at one of four quality levels. An A quality level 512, a B quality level 514, a C quality level 516, and a D quality level 518. For each quality level shown, a preciseness 520 of a security risk index, a sample security risk index 522, and a depth of inquiry 524 in the gathering of factor components may be displayed. A security risk index with a higher quality level may be determined at a higher preciseness than a security risk index with a lower level of preciseness. As FIG. 5 illustrates, this difference in preciseness may be represented in the reporting scheme by reporting a security risk index using an indicator including a number; a range of numbers; a signal, such as a color or other signal, that represents a range of numbers; a signal; or another indicator.

Figure 6:
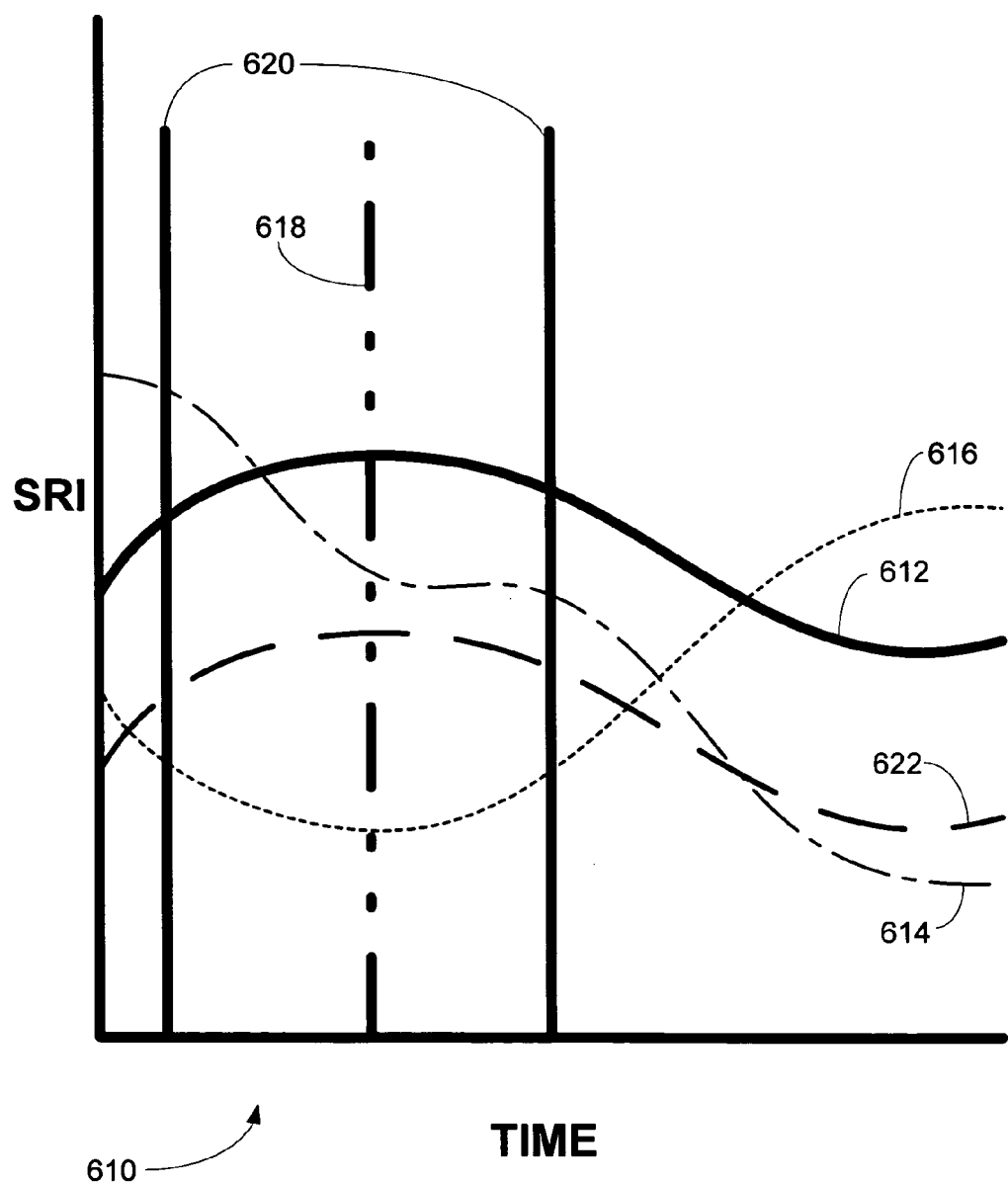
FIG. 6 illustrates a graphical representation of various embodiments of a security risk index.

FIG. 6 illustrates a graphical representation 610 of a general security risk index 612 of all of the information resources associated with the network 228, a first local security risk index 614 for a specific subset of information resources associated with the entity 224A, and a second local security risk index 616 for another specific subset of information resources associated with another entity or group of entities. According to various embodiments of the invention as illustrated, the generation of security risk indices 612 and 614 may allow for comparison between the security of the information resources associated with the entity 224A and the security of information resources associated with the network 228 in general.

In some embodiments of the invention, comparing the first local security risk index 614 of the specific subset of information resources associated with the entity 224A with the second local security risk index 616 of the specific subset of information resources associated with the other entity or group of entities may allow for the security of the specific subsets of information resources associated with the entity 224A and the other entity or group of entities to be compared despite at least one difference between the subsets of information resources and/or the entities. A difference between the subsets of information resources may include a size difference, a difference in an amount of information resources, a storage method difference, a resource type difference, or any other difference. A difference between the entity 224A and the other entity or group of entities may include a difference in the sizes of the entity 224A and the other entity or group of entities, a difference in the number of entities included in the entity 224A and the other entity or group of entities, a difference in the types of entities included in the entity 224A and the other entity or group of entities, a difference in the location of the entity 224A and the other entity or group of entities, or any other difference between the entity 224A and the other entity or group of entities.

FIG. 6 further illustrates how a security risk index may permit changes in a level of security of information resources to be observed. These changes may include general trends observed by viewing the general security risk index 612 over time. Or, the general security effects of a particular innovation 618 in information resource security by comparing the general security risk index 612 prior to the particular innovation 618 to the general security risk index 612 subsequent to the particular innovation 618.

Further, trends in the security of the specific subset of information resources associated with the entity 224A may be monitored over time by observing the first local security risk index 614 over time. Or an effectiveness of at least one mitigating measure 620, implemented by the entity 224A and designed to increase the security of the specific subset of information resources associated with the entity 224A, may be observed by comparing the first local security risk index 614 prior to the at least one mitigating measure 620 with the first local security risk index 614 subsequent to the at least one mitigating measure 620.

Also, changes to the security level of the specific subset of information resources associated with the entity 224A in relation to the general security of information resources associated with the network 228 can be monitored over time by comparing the first local security risk index 614 with the general security risk index 612. Similarly, the relative changes to the security level of the specific subset of information resources associated with the entity 224A and the specific subset of information resources associated with the other entity or group of entities can be observed, by viewing the first local security risk index 614 and the second local security risk index 616 over time.

The graphical representation 610 further illustrates how the first local security risk index 614 may be used to certify the security of the specific subset of information resources associated with the entity 224A by certifying the security of the specific subset of information resources when the first local security risk index 614 of the specific subset of information resources reaches a certification level 622. The certification level 622 is shown in FIG. 6 as a dynamic value determined in part by the general security risk index 612. However, a fixed value, or some other value may alternatively be used as the certification value 622. The certification of the security of the specific subset of information resources associated with the entity 224A may provide the entity 224A with an objective security goal, and may further allow the entity 224A to verify to outside parties such as clients, partners, insurers, vendors, consultants, associates, competitors, or other parties, that the specific subset of information resources associated with the entity 224A is secure.

In some embodiments of the invention, a previously determined security risk index of a subset of information resources may be evaluated to determine if the security risk index indicates a security level meets or exceeds a security threshold. This evaluation may serve as a prerequisite for performing an action with respect to the subset of information resources wherein the action may not be enabled unless the security risk index indicates a security level higher than the security threshold. An action may include, connecting to one or more of the information resources, downloading one or more of the information resources, opening one or more of the information resources, otherwise accessing one or more of the information sources, uploading one or more additional information resources to the subset of information resources, or other action. The evaluation and/or the enablement of an action may be completely (or substantially completely) automated. The security threshold may be configurable by a user, or may be determined using another method, such as using a certification level to represent the security threshold, or other method.

What is claimed is:

1. A processor-implemented method for assessing security of a subset of information resources including one or more information resources, wherein the subset of information resources is a subset of a plurality of information resources, the method comprising:

classifying security determination factors;

assigning values to the classified security determination factors;

associating each of the classified security determination factors with at least one security assessment factor wherein the at least one security assessment factor comprises at least one of:
- a threat factor associated with a rate or frequency of security events that threaten the plurality of information resources,
- a vulnerability factor associated with a likelihood of a security event breaching the security of the subset of information resources, and
- an impact factor associated with an expected cost of a breach of the security of the plurality of information resources;

combining the security determination factors associated with the at least one security assessment factor to determine a security assessment factor value based on the values assigned to the security determination factors;

determining, using a computer processor, a security risk index based at least in part on the at least one security assessment factor value, wherein the security risk index represents a security of the subset of information resources;

certifying the security of the specific subset of information resources with the security risk index when a local security risk index of the specific subset of information resources reaches a predetermined certification level indicating that the specific subset of information resources associated with the entity is secure, wherein the certification level is indicated by a dynamic value determined in part by a general security risk index;

tallying a number of the security determination factors associated with the at least one security assessment factor;

determining a security risk index preciseness value derived from the tallied number of security determination factors;

determining a security risk index quality rating derived from the determined preciseness value; and generating an information resource security assessment report including correlation of the security risk index with the security risk index quality rating.

2. The method of claim 1 wherein the subset of information resources includes more than one information resource and/or more than one type of information resource.

3. The method of claim 1 wherein the subset of information resources is associated with one or more entities including at least one of an individual, a group of individuals, an institution, a group of institutions, or a group of individuals and institutions.

4. The method of claim 1 further comprising:

associating each of the security determination factors with a second at least one security assessment factor wherein the second at least one security assessment comprises at least one of:
- a threat factor associated with a rate or frequency of security events that threaten the plurality of information resources,
- a vulnerability factor associated with a likelihood of a security event breaching the security of a second subset of information resources, and
- an impact factor associated with an expected cost of a breach of the security of the plurality of information resources;

combining the security determination factors associated with the second at least one security assessment factor to determine a second security assessment factor value based on the values assigned to the security determination factors;

determining a second security risk index based at least in part on the second at least one security assessment factor value, wherein the second security risk index represents a security of the second subset of information resources; and comparing the security risk index with the second security risk index.

5. The method of claim 4 wherein the subset of information resources is associated with one or more entities including at least one of an individual, a group of individuals, an institution, a group of institutions, or a group of individuals and institutions; and the second subset of information resources is associated with a second one or more entities including at least one of an individual, a group of individuals, an institution, a group of institutions, or a group of individuals and institutions.

6. The method of claim 1 further comprising:

detecting for the presence of a predetermined trigger;

updating the at least one security assessment factor value upon detection of the predetermined trigger; and updating the security risk index based at least in part on the updated at least one factor value.

7. The method of claim 6 wherein the predetermined trigger includes at least one of an end of a predetermined time period, a predetermined security related action or event, and a change in the at least one security assessment factor that exceeds a predetermined amount.

8. The method of claim 1 further comprising:

updating the at least one security assessment factor value;

updating the security risk index based at least in part on the updated at least one security assessment factor value; and comparing the updated security risk index with one or more previously determined security risk indexes representing the security of the subset of information resources.

9. The method of claim 1 further comprising:

selecting an electronic action related to the subset of information resources;

comparing the security of the subset of information resources to a security threshold by comparing the security risk index with a threshold value associated with the security threshold; and enabling the electronic action if the security of the subset of information resources exceeds the security threshold.

10. The method of claim 1, further comprising:

configuring a graphical representation of the security risk index based on the security risk index preciseness value; and providing the configured graphical representation of the security risk index for display.

11. The method of claim 10, wherein the graphical representation of the security risk index is configured with a color representative of a security risk index preciseness.

12. The method of claim 1, further comprising:

comparing the security risk index to a certification threshold; and certifying the subset of information resources as secure in accordance with the comparing.

13. The method of claim 12, wherein the certification threshold is specifically associated with the subset of information resources.

14. The method of claim 4, further comprising:
determining a certification threshold based on the second security risk index;
comparing the security risk index to the certification threshold; and
certifying the subset of information resources based on the comparing.

15. The method of claim 1, wherein at least one of the security determination factors comprises a local vulnerability factor component, and further comprising:
identifying N mitigating measures associated with the local vulnerability factor component, the N mitigating measures being selected from the group consisting of: deterrence measures, protection measures, detection measures, recovery measures and transference measures;
accessing security event prevention probabilities $E_1, E_2, \ldots, E_N$ associated with each of the N mitigating measures; and
wherein assigning values to the security determination factors further comprises:
assigning a local vulnerability factor component value LVFC according to:

$$LVFC = 1 - [(1-E_1)(1-E2) \ldots (1-E_N)].$$

16. A system for assessing security of a subset of information resources, including one or more information resources, wherein the subset of information resources is a subset of a plurality of information resources, the system comprising a plurality of modules stored in non-transitory computer-readable media, the modules including:
a classification module for classifying security determination factors;
an assignment module for assigning values to the security determination factors;
a factor determining module for associating each of the security determination factors with at least one security assessment factor wherein the at least one security assessment factor comprises at least one of:
a threat factor associated with a rate or frequency of security events that threaten the plurality of information resources,
a vulnerability factor associated with a likelihood of a security event breaching the security of the subset of information resources, and
an impact factor associated with an expected cost of a breach of the security of the plurality of information resources; and
for combining the security determination factors associated with the at least one security assessment factor to determine a security assessment factor value based on the values assigned to the security determination factors; and
a security risk index determining module for
determining a security risk index based at least in part on the at least one security assessment factor value wherein the security risk index represents a security of the subset of information resources, and
certifying the security of the specific subset of information resources with the security risk index when a local security risk index of the specific subset of information resources reaches a predetermined certification level indicating that the specific subset of information resources associated with the entity is secure, wherein the certification level is indicated by a dynamic value determined in part by a general security risk index;
a security risk index preciseness determining module for
tallying a number of security determination factors associated with at least one security assessment factor;
determining a security risk index preciseness value derived from the tallied number of security determination factors;
determining a security risk index quality rating derived from the determined preciseness value; and
generating an information resource security assessment report including correlation of the security risk index with the security risk index quality rating.

17. The system of claim 16 wherein the subset of information resources is associated with one or more entities including at least one of an individual, a group of individuals, an institution, a group of institutions, or a group of individuals and institutions.

18. The system of claim 16 further comprising a trigger module for detecting for the presence of a predetermined trigger wherein the at least one factor value is updated upon the detection of the predetermined trigger by the trigger module and the security risk index based at least in part on the updated at least one security assessment factor value is also updated.

19. The system of claim 18 wherein the predetermined trigger includes at least one of an end of a predetermined time period, a predetermined security related action or event, and a change in the at least one security assessment factor that exceeds a predetermined amount.

20. The system of claim 16 further comprising a security assessment factor component gathering module for performing at least one gathering activity to gather at least one security assessment factor component wherein the at least one factor is based at least in part on the at least one security assessment factor component.

21. The system of claim 20 wherein the at least one gathering activity includes at least one of a modeling activity, a data mining activity, a surveying activity, and a searching activity.

22. A system for assessing security of one or more information resources, the system comprising a plurality of modules stored in non-transitory computer-readable media, the modules including:
a classification module for classifying security determination factors;
an assignment module for assigning values to the security determination factors;
a security assessment factor determining module for associating each of the security determination factors with at least one security assessment factor associated with the information resources wherein the at least one security assessment factor comprises at least one of a threat factor, a vulnerability factor and an impact factor, and for combining the security determination factors associated with the at least one security assessment factor to determine a security assessment factor value based on the values assigned to the security determination factors;
a security risk index determining module for
determining a security risk index based at least in part on the at least one security assessment factor value wherein the security risk index represents a security of the information resources, and
certifying the security of the specific subset of information resources with the security risk index when a local security risk index of the specific subset of information resources reaches a predetermined certification level indicating that the specific subset of information resources associated with the entity is secure, wherein the certification level is indicated by a dynamic value determined in part by a general security risk index;

a security risk index preciseness determining module for tallying a number of security determination factors associated with the at least one security assessment factor, determining a security risk index preciseness value derived from the tallied number of security determination factors, determining a security risk index quality rating derived from the determined preciseness value, and generating an information resource security assessment report including correlation of the security risk index with the security risk index quality rating; and a trigger module for detecting for the presence of a predetermined trigger wherein the at least one security assessment factor is updated upon the detection of the predetermined trigger by the trigger module and the security risk index based at least in part on the updated at least one security assessment factor is also updated.

23. The system of claim 22 wherein the predetermined trigger includes at least one of an end of a predetermined time period, a predetermined security related action or event, and a change in the at least one security assessment factor that exceeds a predetermined amount.

24. A processor-implemented method for assessing security of a plurality of information resources, the method comprising:

classifying security determination factors;
assigning values to the security determination factors;
associating each of the security determination factors with at least one security assessment factor wherein the at least one security assessment factor comprises at least one of:
a threat factor associated with a rate or frequency of security events that threaten the plurality of information resources,
a vulnerability factor associated with a likelihood of a security event breaching the security of information resources, and
an impact factor associated with an expected cost of a breach of the security of the plurality of information resources;
combining the security determination factors associated with the at least one security assessment factor to determine a security assessment factor value based on the values assigned to the security determination factors;
determining, using a computer processor, a security risk index based at least in part on the at least one security assessment factor value wherein the security risk index represents a security of the plurality of information resources
certifying the security of the specific subset of information resources with the security risk index when a local security risk index of the specific subset of information resources reaches a predetermined certification level indicating that the specific subset of information resources associated with the entity is secure, wherein the certification level is indicated by a dynamic value determined in part by a general security risk index;
tallying a number of security determination factors associated with the at least one security assessment factor;
determining a security risk index preciseness value derived from the tallied number of security determination factors;

determining a security risk index quality rating derived from the determined preciseness value; and
generating an information resource security assessment report including correlation of the security risk index with the security risk index quality rating.

25. The method of claim 24 further comprising:
detecting for the presence of a predetermined trigger;
updating the at least one security assessment factor value upon detection of the predetermined trigger; and
updating the security risk index based at least in part on the updated at least one security assessment factor.

26. The method of claim 25 wherein the predetermined trigger includes at least one of an end of a predetermined time period, a predetermined security related action or event, and a change in the at least one security assessment factor that exceeds a predetermined amount.

27. A processor-implemented method for assessing security of a subset of information resources including one or more information resources, wherein the subset of information resources is a subset of a plurality of information resources, the method comprising:

gathering security factor components pertaining to future security events from at least one of a chat room and a message board;
classifying the security factor components as either internal factor components or external factor components;
assigning values to classified security factor components based on historical correlation;
associating each classified security factor to at least one security assessment factor, the security assessment factors including:
a threat factor associated with a rate of security events threatening security of the plurality of information resources;
a vulnerability factor associated with a probability that a security event will lead to a breach in security; and
an impact factor associated with an expected cost of a breach of security;
normalizing the classified security factor components to yield a plurality of normalized classified security factor components which may be combined;
weighting the normalized classified security factor components to yield a plurality of weighted normalized classified security factor components, wherein the weighting of the normalized classified security factor components associated with the vulnerability factor is based on a past rate of success for a specific type of security event against the subset of information resources;
combining values for the weighted classified security factor components associated with the threat factor to yield a threat factor value via Bayesian logic;
combining values for the weighted classified security factor components associated with the vulnerability factor to yield a vulnerability factor value via Bayesian logic;
combining values for the weighted classified security factor components associated with the impact factor to yield an impact factor value via Bayesian logic;
determining, using a computer processor, a security risk index as a product between the threat factor value, the vulnerability factor value, and the impact factor value;
certifying the security of the specific subset of information resources with the security risk index when a local security risk index of the specific subset of information resources reaches a predetermined certification level indicating that the specific subset of information resources associated with the entity is secure, wherein the certification level is indicated by a dynamic value determined in part by a general security risk index:

tallying numbers of security factor components associated with each security assessment factor;

determining a security risk index preciseness value derived from the tallied numbers of security factor components;

determining a security risk index quality rating derived from the determined preciseness value; and generating an information resource security assessment report including correlation of the security risk index with the security risk index quality rating.

* * * * *